United States Patent
Sun et al.

(10) Patent No.: US 9,336,927 B2
(45) Date of Patent: May 10, 2016

(54) HALOGEN-FREE, FLAME RETARDANT COMPOSITION FOR WIRE AND CABLE APPLICATIONS

(75) Inventors: Yabin Sun, Shanghai (CN); Journey Lu Zhu, Shanghai (CN); David Hong Fei Guo, Shanghai (CN); Xiangyang Tai, Shanghai (CN); Yurong Cao, Shanghai (CN); Xiaorong A. He, Shanghai (CN); Leon Bin Li, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 186 days.

(21) Appl. No.: 13/990,084

(22) PCT Filed: Dec. 17, 2010

(86) PCT No.: PCT/CN2010/079933
§ 371 (c)(1),
(2), (4) Date: May 29, 2013

(87) PCT Pub. No.: WO2012/079243
PCT Pub. Date: Jun. 21, 2012

(65) Prior Publication Data
US 2015/0155075 A1    Jun. 4, 2015

(51) Int. Cl.
| | |
|---|---|
| C08L 23/12 | (2006.01) |
| C08K 5/52 | (2006.01) |
| H01B 7/295 | (2006.01) |
| C08L 23/10 | (2006.01) |
| C09D 5/18 | (2006.01) |
| C09K 21/14 | (2006.01) |
| H01B 3/44 | (2006.01) |
| H01B 7/29 | (2006.01) |
| C08K 5/3492 | (2006.01) |

(52) U.S. Cl.
CPC ............... *H01B 7/295* (2013.01); *C08L 23/10* (2013.01); *C09D 5/185* (2013.01); *C09K 21/14* (2013.01); *H01B 3/441* (2013.01); *H01B 3/442* (2013.01); *H01B 7/292* (2013.01); *C08K 5/34928* (2013.01); *C08K 5/5205* (2013.01); *C08L 2201/02* (2013.01)

(58) Field of Classification Search
CPC ......... C08L 23/12; C08K 5/52; C08K 5/5205
See application file for complete search history.

(56) References Cited

U.S. PATENT DOCUMENTS

| | | | |
|---|---|---|---|
| 3,810,850 A | 5/1974 | Rowton | |
| 4,144,202 A | 3/1979 | Ashcraft et al. | |
| 4,789,699 A | 12/1988 | Kieffer et al. | |
| 5,093,422 A | 3/1992 | Himes | |
| 5,246,783 A | 9/1993 | Spenadel et al. | |
| 5,272,236 A | 12/1993 | Lai et al. | |
| 5,278,272 A | 1/1994 | Lai et al. | |
| 5,332,613 A | 7/1994 | Taylor et al. | |
| 5,502,112 A * | 3/1996 | Peacock ........................ | 525/240 |
| 5,504,172 A | 4/1996 | Imuta et al. | |
| 5,986,028 A | 11/1999 | Lai et al. | |
| 6,404,971 B2 | 6/2002 | Mehl | |
| 6,496,629 B2 | 12/2002 | Ma et al. | |
| 6,525,157 B2 | 2/2003 | Cozewith et al. | |
| 6,582,829 B1 | 6/2003 | Quinn et al. | |
| 6,714,707 B2 | 3/2004 | Rossi et al. | |
| 6,960,635 B2 | 11/2005 | Stevens et al. | |
| 7,132,466 B2 * | 11/2006 | Kierkels et al. .............. | 524/100 |
| 7,199,203 B2 | 4/2007 | Stevens et al. | |
| 7,465,761 B2 | 12/2008 | Murase et al. | |
| 8,444,884 B2 * | 5/2013 | Futterer et al. .............. | 252/606 |
| 2004/0087235 A1 | 5/2004 | Morman et al. | |
| 2004/0122408 A1 | 6/2004 | Potnis et al. | |

(Continued)

FOREIGN PATENT DOCUMENTS

| | | | |
|---|---|---|---|
| DE | 102007035417 A1 * | 1/2009 | |
| DE | 19983137 B4 | 4/2009 | |

(Continued)

OTHER PUBLICATIONS

JLS (JLS PNP—Based on Ammonium Polyphosphate, 2015, 1 page).*

(Continued)

*Primary Examiner* — Brieann R Fink
(74) *Attorney, Agent, or Firm* — Whyte Hirschboeck Dudek S.C.

(57) ABSTRACT

A halogen-free, flame retardant composition comprises: A. A polymer blend comprising: 1. Polypropylene, and 2. Thermoplastic elastomer (TPE) other than the polypropylene of (A) (1), and B. An intumescent flame retardant comprising at least one of: 1. A compound of Formula 1 where M is at least one of melamine, morpholine, piperazine, piperidine, alkyl hydroxyl and a triazine polymer of Formula 2 where D is a heterocyclic or polyamine moiety, and m and n are independently integers the sum (m+n) of which is less than 1000, and 2. A piperazine phosphate.

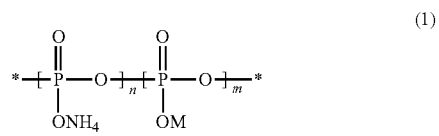

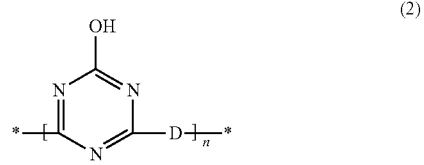

14 Claims, No Drawings

(56) References Cited

U.S. PATENT DOCUMENTS

| | | | |
|---|---|---|---|
| 2004/0122409 A1 | 6/2004 | Thomas et al. | |
| 2006/0211819 A1 | 9/2006 | Hoenig et al. | |
| 2007/0176154 A1 | 8/2007 | Murase et al. | |
| 2008/0277136 A1* | 11/2008 | Reyes | 174/110 R |
| 2009/0090535 A1* | 4/2009 | Reyes et al. | 174/110 SR |
| 2011/0082241 A1* | 4/2011 | Kaneda et al. | 524/100 |
| 2011/0092622 A1 | 4/2011 | Kaneda et al. | |
| 2011/0180300 A1 | 7/2011 | Gu et al. | |
| 2011/0294930 A1* | 12/2011 | Lo et al. | 524/100 |

FOREIGN PATENT DOCUMENTS

| | | | |
|---|---|---|---|
| EP | 0712892 B1 | | 3/2002 |
| EP | 1516907 A1 | | 3/2005 |
| EP | 0894820 B1 | | 9/2008 |
| JP | 7-228710 | | 8/1995 |
| JP | 2008-063458 A | | 3/2008 |
| WO | 00/01745 A1 | | 1/2000 |
| WO | 2004/041538 A1 | | 5/2004 |
| WO | 2009/153934 A1 | | 12/2009 |
| WO | WO 2009147830 A1 * | | 12/2009 |
| WO | 2010/039616 A2 | | 4/2010 |
| WO | 2010/063748 A1 | | 6/2010 |
| WO | 2011/079457 A1 | | 7/2011 |
| WO | WO 2011079457 A1 * | | 7/2011 |

OTHER PUBLICATIONS

Machine translation of JP 2008-063458.

* cited by examiner

HALOGEN-FREE, FLAME RETARDANT COMPOSITION FOR WIRE AND CABLE APPLICATIONS

CROSS REFERENCE TO RELATED APPLICATION

The present application is the national phase of PCT Patent Application No. PCT/CN2010/079933 filed Dec. 17, 2010, the entire content of which is incorporated by reference herein.

BACKGROUND OF THE INVENTION

1. Field of the Invention

This invention relates to wire and cable. In one aspect the invention relates to wire and cable insulation and protective jackets while in another aspect, the invention relates to wire and cable insulation and protective jackets comprising a flame retardant (FR) free of halogen. In yet another aspect the invention relates to such wire and cable insulation and protective jackets in which the flame retardant comprises a hybrid polyphosphate of ammonium, melamine, piperazine and triazine polymer.

2. Description of the Related Art

Thermoplastic polyurethane (TPU)-based halogen free flame retardant (HFFR) product packages are usually employed for wire insulation/cable jackets for personal electronics. These are used as a replacement for halogen containing products. Advantages of this type of product are superior mechanical properties and flexibility. Additionally, TPU-based FR polymers fulfill the heat deformation testing (UL-1581) requirements at 150° C., which is particularly important for some applications and, generally, can not be achieved by using uncrosslinked polyolefin as the polymer matrix. However, the main disadvantages for TPU-based FR compositions are insulation resistance (IR) failure, poor smoke density, high material density and high cost of TPU. Replacing TPU with polyolefins can potentially solve these. However, polyolefins or polyolefin elastomer-based HFFR usually suffer from a dramatic drop of heat deformation properties due to a lower melting temperature relative to TPU, especially at a high temperature (e.g., 150° C.). In addition, the use of polyolefin components can decrease the overall FR performance because of their hydrocarbon structure.

As such, achieving excellent flame retardancy and balanced mechanical properties is difficult for polyolefin-based HFFR. A solution to this problem remains of continuing interest to the wire and cable industry.

SUMMARY OF THE INVENTION

In one embodiment the invention is a composition comprising:
A. A polymer blend comprising:
1. Polypropylene, and
2. Thermoplastic elastomer (TPE) other than the polypropylene of (A)(1), and
B. An intumescent flame retardant of Formula 1

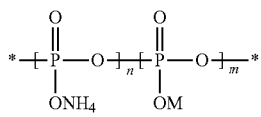

(1)

where M is at least one of melamine, morpholine, piperazine, piperidine, alkyl hydroxyl and a triazine polymer of Formula 2

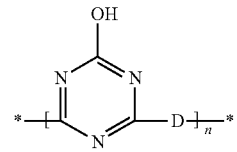

(2)

where D is a heterocyclic or polyamine moiety, and m and n are independently integers the sum (m+n) of which is less than (<) 1000.

In one embodiment the invention is a composition comprising:
A. A polymer blend comprising:
1. Polypropylene, and
2. Thermoplastic elastomer (TPE) other than the polypropylene of (A)(1), and
B. An intumescent flame retardant comprising piperazine phosphate.

In one embodiment the invention is a composition comprising:
A. A polymer blend comprising:
1. Polypropylene, and
2. Thermoplastic elastomer (TPE) other than the polypropylene of (A)(1), and
B. An intumescent flame retardant composition comprising:
1. An intumescent flame retardant of Formula 1

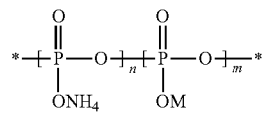

(1)

where M is at least one of melamine, morpholine, piperazine, piperidine, alkyl hydroxyl and a triazine polymer of Formula 2

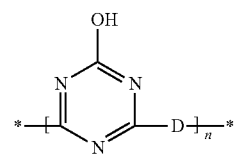

(2)

where D is a heterocyclic or polyamine moiety, and m and n are independently integers the sum (m+n) of which is less than (<) 1000, and
2. A piperazine phosphate.

The polypropylene is typically present in the composition as a continuous phase or as a co-continuous phase with TPE. The TPE is typically present in the composition as a dispersed phase or as a co-continuous phase with the polypropylene. The intumescent flame retardant component of these compositions can be used neat, i.e., without any other flame retardant or additives, or in combination with another flame retardant and/or additive, or in combination with one another with or without combination with another flame retardant and/or additive.

The compositions of this invention are useful in preparing wire and cable insulation and jackets that afford (i) excellent flame retardant performance, e.g., pass both mimic VW-1 and VW-1 test, (ii) excellent heat deformation performance, e.g., pass UL1581-2001 test at 150° C., (iii) tensile stress greater than (>) 8.3 MPa, and (iv) tensile elongation >200% (ASTM D638). In addition, the inventive compositions have much lower density than TPU-based HFFR.

In one embodiment the invention is a wire or cable sheath, e.g., insulation or semiconductor sheath, protective outer jacket, etc., made from the inventive composition.

In one embodiment the invention is a wire or cable comprising a sheath made from the inventive composition.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of the components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Blend", "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" and like terms means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Random interpolymer" or "random copolymer" means an interpolymer or copolymer in which the comonomer is randomly distributed across the polymer chain. In a random propylene copolymer in which the comonomer is ethylene, then the units in the polymer derived from polymerized ethylene are randomly distributed across the polymer chain. In a random ethylene copolymer in which the comonomer is propylene, then units in the polymer derived from polymerized propylene are randomly distributed across the polymer chain.

"Olefin-based polymer", "polyolefin", "PO" and like terms means a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of the composition as a wire or cable covering.

"Intumescent flame retardant" and like terms means a flame retardant that yields a foamed char formed on a surface of a polymeric material during fire exposure.

Polypropylene

The polypropylene component of the polymer blend of (A) typically comprises at least 5, more typically at least 10 and even more typically at least 20, weight percent (wt %) of the blend, and typically is in a range from 5 to 80, from 5 to 60, from 5 to 50, and preferably from 5 to 45, wt % of the composition.

In one embodiment the polypropylene comprises greater than (>) 90, or >95, or >97, or >98, or >99 weight percent polymerized propylene monomer and, optionally, may comprise at least one polymerized comonomer. Propylene polymers of the invention include propylene homopolymers as well as random copolymers of propylene, and mixtures of these polymers. The propylene polymer can be isotactic, syndiotactic or atactic polypropylene. The distribution of the propylene units in the interpolymer chain can be random, ordered or blocky.

"Propylene homopolymer" and similar terms mean a polymer consisting solely or essentially all of units derived from polymerized propylene monomer. "Propylene interpolymer", "propylene copolymer" and similar terms mean a polymer comprising units derived from polymerized propylene and ethylene and/or one or more other unsaturated comonomers, e.g., butene, hexene, octene, etc. For propylene interpolymers the comonomer content is typically less than 10, more typically 1 to 5, and even more typically 1 to 3, wt %. Random propylene copolymers typically comprise 90 or more wt % units derived from polymerized propylene, with the remainder of the units derived from polymerized units of at least one α-olefin.

The melt flow rate (MFR, as measured by ASTM D1238 at 230° C./2.16 kg) of the propylene polymer is typically less than 20 g/10 min., and more typically at least 1, 1.5, and even more typically at least 1.9, g/10 min., and typically up to 2, 5, 7, most typically up to 12, g/10 min., in order to achieve good processability and mechanical properties balance. The propylene polymer preferably exhibits a peak melting point ($T_{max}$), as determined by differential scanning calorimetry (DSC), of 100-170° C., and preferably higher than 140° C. The $T_{max}$ and other thermal properties of the propylene polymers can be measured using the DSC method described in U.S. Pat. No. 7,199,203.

Polypropylene homopolymers are commercially available and include polypropylene homopolymer resins DOW 5D49 (MFR=38 g/10 min), DOW 5D98 (MFR=3.4 g/10 min), DOW 5E16S (MFR=35 g/10 min), and DOW 5E89 (MFR=4.0 g/10 min), among others, all available from The Dow Chemical Company. Although propylene homopolymers are a readily available and competitively priced material, random and impact copolymers are preferred for their compatibility with the thermoplastic elastomer, particularly a TPE based on polymerized ethylene and/or propylene. These combinations of random and/or impact propylene interpolymers with TPE typically provide a composition with very desirable physical and mechanical properties for the resulting articles (such as tensile, tear, dart impact, or puncture resistance in wire and cable coverings and/or films). In comparison with propylene homopolymers, random propylene copolymers exhibit improved optical properties (i.e., clarity and haze), improved impact resistance, increased flexibility and a decreased melting point. Random propylene copolymers are used in many applications, typically those that require improved clarity and/or impact resistance (as compared to propylene homopolymers).

The propylene interpolymers used in the practice of this invention comprise units of polymerized propylene and one or more polymerized comonomers. Typically the comonomer is an alpha-olefin (α-olefin), preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (e.g., α-methylstyrene, etc.) are α-olefins for purposes of this invention. Illustrative polypropylene copolymers include but are not limited to propylene/ethylene, propylene/1-butene, propylene/1-hexene, propylene/1-octene, and the like. Copolymer polypropylenes are commercially available and include random copolymer polypropylene resins DS6D82 (MFR=7.0 g/10 min), 6D83K (MFR=1.9 g/10 min), C715-12NHP (MFR=12 g/10 min), among others, all available from The Dow Chemical Company.

The polypropylenes used in the practice of this invention include impact-modified polypropylenes. "Impact-modified polypropylene" and like terms refer to heterophasic propylene copolymers in which polypropylene, e.g., propylene homopolymer, is the continuous phase (matrix) and an elastomeric phase is uniformly dispersed within it. The elastomeric phase of the impact-modified polypropylene may be the same or different than the TPE component of the polymer blend of composition of the invention. Polypropylene impact copolymers can be produced by mechanical blending or through the use of multi-stage reactors. Usually these impact copolymers are formed in a dual or multi-stage process. Illustrative impact-modified propylene copolymers include those commercially available from The Dow Chemical Company under the trade designations C766-03 (MFR=3 g/10 min), C7057-07(MFR=7 g/10 min), C7061-01N (MFR=1.5 g/10 min), C706-21NA HP (MFR=21 g/10 min).

In one embodiment the propylene/α-olefin copolymers are further characterized as comprising (A) from 90 up to but less than 100, or from 90 to 99, or from 95 to 99, wt % units derived from propylene, and (B) from greater than zero to 10, or from 1 to 5, or from 1 to 3, or from 1 to 2, wt % units derived from at least one of polymerized ethylene and/or a polymerized $C_{4-10}$ α-olefin; and containing an average of at least 0.001, at least 0.005 and more preferably at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene interpolymer is not critical to the definition of this embodiment of the instant invention, but typically it does not exceed 3 long chain branches/1000 total carbons. Such propylene/α-olefin copolymers are further described in PCT/U.S. Ser. No. 08/082,599.

The amount of polypropylene in the inventive composition can vary widely, but typically the amount is from 1 to 45, more typically from 5 to 30 and even more typically from 10 to 25, weight percent based on the composition. In calculating the amount of polypropylene in the inventive composition, if the polypropylene is an impact-modified polypropylene, then the amount of polypropylene is the amount of impact-modified polypropylene less the elastomeric phase component of the impact-modified polypropylene.

For the purposes of this invention, the polypropylene component of the inventive composition does not include propylene-based plastomers and elastomers as described in U.S. Pat. Nos. 6,960,635 and 6,525,157 and/or as commercially available from The Dow Chemical Company, under the trademark VERSIFY, or from ExxonMobil Chemical Company, under the trademark VISTAMAXX. Rather, these plastomers and elastomers are included in the TPE component of the composition, and are more fully described below.

Thermoplastic Elastomer (TPE)

In one embodiment of the invention, the TPE component of the polymer blend comprises at least 5, at least 10, and preferably at least 20, weight percent (wt %), and is in a range from 5 to 80, from 10 to 80, from 10 to 40, and preferably from 20 to 40, wt % of the composition. In one embodiment the TPE is a polyolefin (PO) that (1) has the properties of an elastomer, i.e., the ability to be stretched beyond its original length and retract to substantially its original length when released, and (2) can be processed like a thermoplastic, i.e., to soften when exposed to heat and return to substantially its original condition when cooled to room temperature.

The TPE used in the practice of this invention do not include the polypropylenes described above. In one embodiment the TPE used in the practice of this invention comprises no more than 97, or less than (<) 95, or <90, or <85, or <80, or <75, or <50, or <40, weight percent polymerized propylene. Preferred TPE have melting temperature (DSC Tm peak as measured, for example, by the DSC procedure described in U.S. Pat. No. 6,566,446) of 50-130° C. Nonlimiting examples of suitable TPE include styrenic block copolymers (e.g., SEBS), ethylene-based elastomers/plastomers (e.g., ENGAGE™ and AFFINITY ethylene-based copolymers), ethylene block copolymers (OBCs) (e.g., INFUSE™ 9507 or 9100 OBC) and propylene-based plastomers and elastomers (e.g. VERSIFY™ 3300 and 4200).

In general, styrenic block copolymers suitable for the invention include at least two mono-alkenyl arene blocks, preferably two polystyrene blocks, separated by a block of saturated conjugated diene, preferably a saturated polybutadiene block. The preferred styrenic block copolymers have a linear structure, although in some embodiments, branched or radial polymers or functionalized block copolymers make useful compounds. The total number average molecular weight of the styrenic block copolymer is preferably from 30,000 to 250,000 if the copolymer has a linear structure. Such block copolymers typically have an average polystyrene content from 6 to 65, more typically from 10 to 40 wt % of the copolymer. Examples of styrenic block copolymers suitable for the invention are described in EP0712892, WO 2004/041538, U.S. Pat. Nos. 6,582,829, 4,789,699, 5,093,422 and 5,332,613, and US 2004/0087235, 2004/0122408, 2004/0122409, and 2006/0211819. Nonlimiting examples of suitable styrenic block copolymers include styrene/butadiene (SB) copolymers, styrene/ethylene/butadiene/styrene (SEBS) terpolymers, styrene/butadiene/styrene (SBS) terpolymers, hydrogenated SBS or SEBS, styrene/isoprene (SI), and styrene/ethylene/propylene/styrene (SEPS) terpolymers. Commercial sources of styrenic block copolymers include Kraton Polymers (SEBS G1643M, G1651ES), Asahi Kasei Chemicals Corporation, and Kuraray America.

In one embodiment the TPE polymer is an ethylene/α-olefin block copolymer. "Olefin block copolymers," "olefin block interpolymers," "multi-block interpolymers" and like terms refer to a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property.

The term "ethylene multi-block interpolymers" means a multi-block interpolymers comprising polymerized ethylene and one or more interpolymerized comonomers, in which ethylene comprises a plurality of the polymerized monomer units of at least one block or segment in the polymer, preferably at least 90, at least 95 and most preferably at least 98, mole % of the block. Based on total polymer weight, the ethylene multi-block interpolymers used in the practice of the present invention preferably have an ethylene content of 25 to 97, of 40 to 96, of 55 to 95, and most preferably of 65 to 85, %.

The ethylene multi-block interpolymers useful in the practice of this invention have a density of less than 0.90, preferably less than 0.89, less than 0.885, less than 0.88 and even more preferably less than 0.875, g/cc. The ethylene multi-block interpolymers typically have a density greater than 0.85, and more preferably greater than 0.86, g/cc. Density is measured by the procedure of ASTM D-792.

Olefinic block copolymers useful in the practice of this invention include INFUSE® OBC, available from The Dow Chemical Company), e.g., INFUSE OBC D9100 (1MI, 0.877, 74A Shore), D9500 (5MI, 0.877, 74A Shore), D9507 or D9530 (WI, 0.887, 85A Shore).

In one embodiment the TPE component is a propylene-based plastomer or elastomer such as the VERSIFY™ plastomers and elastomers available from The Dow Chemical Company and the VISTAMAXX plastomers and elastomers available from ExxonMobil Chemical Company. For the purpose of this invention, these propylene-based plastomers or elastomers are TPE (A)(2) components, not polypropylene (A)(1) components, of the inventive composition. These plastomers typically have a heat of fusion <100 Joules per gram (J/g), a molecular weight distribution (MWD)<3.5, and an ethylene or other alpha-olefin comonomer content of 3 to 10 wt %. These elastomers typically have a heat of fusion <40 J/g, a MWD<3.5, and an ethylene or other alpha-olefin comonomer content of 10 to 15 wt %.

The propylene-based plastomers or elastomers are further characterized as having substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

In one embodiment, the propylene-based plastomers and elastomers may have a melt flow rate in the range of from 0.1 to 500 grams per 10 minutes (g/10 min), measured in accordance with ASTM D-1238 (at 230° C./2.16 Kg). All individual values and subranges from 0.1 to 500 g/10 min are included herein and disclosed herein; for example, the melt flow rate can be from a lower limit of 0.1 g/10 min, 0.2 g/10 min, or 0.5 g/10 min to an upper limit of 500 g/10 min, 200 g/10 min, 100 g/10 min, or 25 g/10 min. For example, the propylene-based plastomers and elastomers may have a melt flow rate in the range of from 0.1 to 200 g/10 min; or in the alternative, the propylene-based plastomers and elastomers may have a melt flow rate in the range of from 0.2 to 100 g/10 min; or in the alternative, the propylene-based plastomers and elastomers may have a melt flow rate in the range of from 0.2 to 50 g/10 min; or in the alternative, the propylene-based plastomers and elastomers may have a melt flow rate in the range of from 0.5 to 50 g/10 min; or in the alternative, the propylene-based plastomers and elastomers may have a melt flow rate in the range of from 1 to 50 g/10 min; or in the alternative, the propylene-based plastomers and elastomers may have a melt flow rate in the range of from 1 to 40 g/10 min; or in the alternative, the propylene-based plastomers and elastomers may have a melt flow rate in the range of from 1 to 30 g/10 min.

In one embodiment the propylene-based plastomers and elastomers may have crystallinity in the range of from at least 1 percent by weight (a heat of fusion (Hf) of at least 2 Joules/gram (J/g)) to 30 percent by weight (a Hf of less than 50 J/g). All individual values and subranges from 1 percent by weight (a Hf of at least 2 J/g) to 30 percent by weight (a Hf of less than 50 J/g) are included herein and disclosed herein; for example, the crystallinity can be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the propylene-based plastomers and elastomers may have a crystallinity in the range of from at least 1 percent by weight (a Hf of at least 2 J/g) to 24 percent by weight (a Hf of less than 40 J/g); or in the alternative, the propylene-based plastomers and elastomers may have a crystallinity in the range of from at least 1 percent by weight (a Hf of at least 2 J/g to 15 percent by weight (a Hf of less than 24.8 J/g); or in the alternative, the propylene-based plastomers and elastomers may have a crystallinity in the range of from at least 1 percent by weight (a Hf of at least 2 J/g) to 7 percent by weight (a Hf of less than 11 J/g); or in the alternative, the propylene-based plastomers and elastomers may have a crystallinity in the range of Hf of less than 8.3 J/g). The crystallinity is measured by differential scanning calorimetry (DSC) as described in U.S. Pat. No. 7,199,203. The propylene-based plastomers and elastomers comprise units derived from propylene and polymeric units derived from one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins.

In one embodiment the propylene-based plastomers and elastomers comprise from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene-based plastomers and elastomers comprise from 1 to 35 percent by weight of one or more alpha-olefin comonomers; or in the alternative, the propylene-based plastomers and elastomers comprise from 1 to 30 percent by weight of one or more alpha-olefin comonomers; or in the alternative, the propylene-based plastomers and elastomers comprise from 3 to 27 percent by weight of one or more alpha-olefin comonomers; or in the alternative, the propylene-based plastomers and elastomers comprise from 3 to 20 percent by weight of one or more alpha-olefin comonomers; or in the alternative, the propylene-based plastomers and elastomers comprise from 3 to 15 percent by weight of one or more alpha-olefin comonomers.

In one embodiment the propylene-based plastomers and elastomers have a melting temperature (Tm) typically of less than 120° C. and a heat of fusion (Hf) typically of less than 70 Joules per gram (J/g) as measured by differential scanning calorimetry (DSC) as described in U.S. Pat. No. 7,199,203.

In one embodiment the propylene-based plastomers and elastomers have a molecular weight distribution (MWD), defined as weight average molecular weight divided by number average molecular weight ($M_w/M_n$), of 3.5 or less; or 3.0 or less; or from 1.8 to 3.0.

In one embodiment, the propylene-based plastomers and elastomers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in detail in International Patent Application No. PCT/US 08/082599.

Other TPE polymers useful in the practice of this invention include, for example, but are not limited to, thermoplastic urethane (TPU), ethylene/vinyl acetate (EVA) copolymers (e.g., Elvax 40L-03 (40% VA, 3MI) (DuPont)), ethylene/ethyl acrylate (EEA) copolymers (e.g., AMPLIFY) and ethylene acrylic acid (EAA) copolymers (e.g., PRIMACOR) (The Dow Chemical Company), polyvinylchloride (PVC), epoxy resins, styrene acrylonitrile (SAN) rubber, and Noryl® modified PPE resin (amorphous blend of polyphenylene oxide (PPO) and polystyrene (PS) by SABIC), among others. Also useful are olefinic elastomers including, for example, very low density polyethylene (VLDPE) (e.g., FLEXOMER® ethylene/1-hexene polyethylene, The Dow Chemical Company), homogeneously branched, linear ethylene/α-olefin copolymers (e.g. TAFMER® by Mitsui Petrochemicals Company Limited and EXACT® by DEX-Plastomers), and homogeneously branched, substantially linear ethylene/α-olefin polymers (e.g., AFFINITY® ethylene-octene plastomers (e.g., EG8200 (PE)) and ENGAGE® polyolefin elastomers, The Dow Chemical Company). Substantially linear ethylene copolymers are more fully described in U.S. Pat. Nos. 5,272,236, 5,278,272 and 5,986,028. Additional olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer, FLEXOMER™, HPDE 3364 and HPDE 8007 polymers (The Dow Chemical Company), ESCORENE™ and EXCEED™ polymers (Exxon Mobil Chemical). Nonlimiting examples of suitable TPUs include PELLETHANE™ elastomers (Lubrizol Corp. (e.g., TPU 2103-90A); ESTANE™, TECOFLEX™, CARBOTHANE™, TECOPHILIC™, TECOPLAST™ and TECOTHANE™ (Noveon); ELASTOLLAN™, etc. (BASF), and commercial TPUs available from Bayer, Huntsman, the Lubrizol Corporation and Merquinsa.

The amount of TPE in the inventive composition can vary widely, but typically the amount is from 1 to 75, more typically from 10 to 60 and even more typically from 20 to 50, weight percent based on the composition.

Halogen-Free, Flame Retardant

In one embodiment the HFFR component of the composition is an intumescent hybrid polyphosphate of Formula 1.

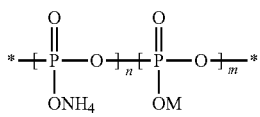

(1)

where M is at least one of melamine, morpholine, piperazine, piperidine, alkyl hydroxyl and a triazine polymer of Formula 2

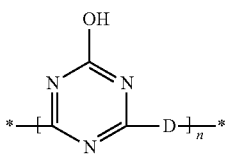

(2)

where D is a heterocyclic or polyamine moiety, and m and n are independently integers the sum (m+n) of which is less than (<) 1000. M can also be a derivative or structural analogue of any of melamine, morpholine, piperazine and piperidine. Representative D moieties include, but are not limited to, ethylene diamine, piperazine, N-aminoethylpiperazine, 1,3-diaminopropane and hexane-1,6-diamine.

In one embodiment the intumescent HFFR component of the composition is a piperazine phosphate. Examples of piperazine phosphates include but are not limited to piperazine pyrophosphate, piperazine orthophosphate and piperazine polyphosphate. Additional examples include polytriazinyl compounds or oligomer or polymer 1,3,5-triazine derivatives including a piperazine group, as described in US 2009/0281215 and WO 2009/016129.

In one embodiment the HFFR component of the composition is a combination, e.g., mixture, of a hybrid polyphosphate of Formula 1 and a piperazine phosphate. While the combination can comprise any amount of either HFFR, e.g., 1-99 wt % hybrid polyphosphate of Formula 1 and 1-99 wt % piperazine phosphate, typically the combination comprises 30-70 wt % of each HFFR.

In one embodiment the HFFR component of the composition is an HFFR system comprising an intumescent hybrid polyphosphate of Formula 1 and/or a piperazine phosphate and one or more organic nitrogen and/or phosphorus-based materials, preferably intumescent materials, such as but not limited to, halogen-free organic phosphonic acids, phosphonates, phosphinates, phosphonites, phosphinites, phosphine oxides, phosphines, phosphites or phosphates, phosphonitrilics, phosphorus ester amides, phosphoric acid amides, phosphonic acid amides, phosphinic acid amides, and melamine and melamine derivatives, including melamine polyphosphate, melamine pyrophosphate and melamine cyanurate, and mixtures of two or more of these materials. Examples include phenylbisdodecyl phosphate, phenylbisneopentyl phosphate, phenyl ethylene hydrogen phosphate, phenyl-bis-3,5,5'-trimethylhexyl phosphate), ethyldiphenyl phosphate, 2-ethylhexyl di(p-tolyl) phosphate, diphenyl hydrogen phosphate, bis(2-ethyl-hexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, triphenyl phosphate, dibutylphenyl phosphate, p-tolyl bis(2,5,5'-trimethylhexyl) phosphate, 2-ethylhexyldiphenyl phosphate, and diphenyl hydrogen phosphate. Phosphoric acid esters of the type described in U.S. Pat. No. 6,404,971 are examples of phosphorus-based FR. Additional examples include liquid phosphates such as bisphenol A diphosphate (BAPP) (Adeka Palmarole) and/or resorcinol bis(diphenyl phosphate) (Fyroflex RDP) (Supresta, ICI), and solid phosphorus such as ammonium polyphosphate (APP), piperazine pyrophosphate, piperazine orthophosphate and piperazine polyphosphate. APP is often used with flame retardant co-additives, such as melamine derivatives. Also useful is Melafine (DSM) (2,4,6-triamino-1,3,5-triazine; fine grind melamine).

In one embodiment the HFFR component of the composition is an HFFR system comprising an intumescent hybrid polyphosphate of Formula 1 and/or a piperazine phosphate and one or more multifunctional compounds such as, but not limited to, pentaerythritol (PER), triglycidyl isocyanurate and novolac, as well as one or more metal oxides or salts such as, but not limited to, zinc oxide, iron oxide, zinc borate and zinc stearate. These additional optional components can be used in know ways and in known amounts.

In one embodiment the HFFR component of the composition is an HFFR system comprising an intumescent hybrid polyphosphate of Formula 1 and/or a piperazine phosphate and one or more salts of phosphoric acid, for example but not limited to, APP, melamine and/or a melamine derivative such as melamine pyrophosphate and melamine polyphosphate. In one embodiment the HFFR system comprises an intumescent FR of Formula 1 in combination with PER, melamine and zinc oxide. In one embodiment the HFFR system comprises a blend of APP and an intumescent FR of Formula 1 in combination with PER, piperazine phosphate, melamine and zinc oxide. In some embodiments, the FR material comprises a melamine-based coating.

The PP/TPE/intumescent FR compositions of this invention, in particular compositions with FP2100J and/or BUDIT 3167 as a primary FR chemical, exhibit excellent burn performance and resulted in a synergistic balance of superior flame retardancy sufficient to pass the VW-1 testing requirements (UL 1581) and tensile properties including a tensile stress larger than 8 MegaPascals (MPa) and a tensile elongation larger than 200% (ASTM D638), a heat deformation ratio <50% at 150° C. (UL1581-2001), and good flexibility and softness (2% Secant modulus <250 MPa (ASTM D638); Shore A hardness of <95 (ASTM D2240).

The HFFR system can comprise any amount of the hybrid polyphosphate of Formula 1 alone, or any amount of piperazine phosphate alone, or any amount of a combination of the hybrid polyphosphate of Formula 1 and piperazine phosphate, but typically the amount of any of these is at least 10, or at least 20, or at least 30, or at least 40, or at least 50 or more, wt % of the system.

The typical amount of HFFR component (i.e., hybrid polyphosphate of Formula 1, or piperazine phosphate, or HFFR system) in the composition is at least 1, 10, 15, and most preferably at least 20, wt % based on the weight of the composition (i.e., polymer blend, HFFR component, and any additives/fillers). The typical maximum amount of the HFFR component does not exceed 70, 60, 50, and more typically does not exceed 45, wt % of the composition.

Optional Additive Package

The compositions of this invention can contain one or more additives such as, but not limited to, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, light stabilizers (such as hindered amines), plasticizers (such as dioctylphthalate or epoxidized soy bean oil), thermal (melt processing) stabilizers, mold release agents, waxes (such as polyethylene waxes), processing aids (such as oils, organic acids such as stearic acid, metal salts of organic acids), and colorants or pigments, to the extent that these additives do not interfere with the desired physical or mechanical properties of the articles made from the compositions of the present invention. These additives are used in known amounts and in known ways, but typically the additive package comprises, if present at all, greater than zero, e.g., 0.01, to 2, more typically 0.1 to 1, wt % of the final composition. Due to the relatively large amount of the flame retardant package in the final composition, other fillers, e.g., talc, a carbonate, etc., and/or other fire retardants, e.g., ATH, are typically not included in the final composition.

Compounding/Fabrication

Compounding of the compositions of this invention can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The compounding temperature for the polymer blend, HFFR component and any additives/fillers is typically from the melting point of the polypropylene or TPE, e.g., 120° C., to 220° C., more typically from 160 to 200° C. The compounding temperature of the polymer matrix with the flame retardant and optional additive packages is typically from 120 to 220° C., more typically from 160 to 200° C. The various components of the final composition can be added to and compounded with one another in any order, or simultaneously, but typically the polymer blend is first compounded followed by the incorporation of the flame retardant component and any additive package. In one embodiment the additive package is first compounded with the HFFR.

In some embodiments the additives are added as a premixed masterbatch. Such masterbatches are commonly formed by dispersing the additives, either separately or together, into an inert plastic resin, e.g., one of the plastic matrix components or a low density polyethylene. Masterbatches are conveniently formed by melt compounding methods.

Articles of Manufacture

In one embodiment, the polymer composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Other articles of manufacture that can be prepared from the polymer compositions of this invention, particularly under high pressure and/or elevated moisture conditions, include fibers, ribbons, sheets, tapes, pellets, tubes, pipes, weather-stripping, seals, gaskets, foams, footwear and bellows. These articles can be manufactured using known equipment and techniques.

The invention is described more fully through the following examples. Unless otherwise noted, all parts and percentages are by weight.

Specific Embodiments

TABLE 1

Raw Materials

| Raw materials | MFR, dg/min ASTM D-1238 | Density, g/cm3 ASTM D-792 | Producer |
|---|---|---|---|
| PP(C715-12) Impact Copolymer Resin | 12 | 0.9 | The Dow Chemical Company |
| SEBS(G1643M) styrene-ethylene-butylene-styrene | 18 (5 kg, 200° C.) | 0.9 | Kraton |
| SEBS (G1651 ES) styrene-ethylene-butylene-styrene | N/A | 0.9 | Kraton |
| VERSIFY ™ 3300 propylene-ethylene copolymer | 8 | 0.888 | The Dow Chemical Company |
| VERSIFY ™ 4200 propylene-ethylene copolymer | 25 | 0.876 | The Dow Chemical Company |
| Pentaerythritol | | | Sinopharm Chemical Reagent Co., Ltd. |
| Melamine | | | JLS |
| JLS PNP 1D (N—P FR)* | | | JLS |
| Zinc Oxide | | | Sinopharm Chemical Reagent Co., Ltd. |
| FR CROS C30, Ammonium polyphosophate | — | | Budenheim |

*HFFR of Formula 1

1.1 Haake Compounding:

Firstly, PP and thermoplastic elastomer are fed into a Haake mixer at 190° C. for about 3 minutes to melt the polymer. Then FR additives are added and mixed for another 3 minutes.

1.2 TSE Compounding:

TSE compounding is conducted on Werner & Pfleiderer ZSK 40 Mc Plus co-rotating intermeshing twin screw extruder. Temperature profile: 180/180/180/180/185/185/185/180/180° C.

1.3 Wire Coating

Wire coating is conducted on a wire coating line with a temperature profile of 160/170/180/180/180/180/175. Diameter of wire is 2 mm and the area of the conductor is 0.75 mm$^2$.

1.4 Injection Moulding

The injection moulding is conducted on FANUC 100 ton high speed with mould temperature of 50° C. and temperature profile of 200/210/205/200/190/50° C. for mechanical testing.

Characterizations 2.1 Heat Deformation

Heat deformation testing is conducted according to UL 1581-2001. The tested sample is cut from a plaque with a thickness of 1.44 mm and is prepared by compression molding at 190° C. For each formulation, two parallel sample plaques are placed into an oven and preheated at 150° C. for one hour. The preheated samples are then pressed with same loading at 150° C. for one hour. Then the pressed samples without removal of weights are placed in an ASTM room with setting temperature at 23° C. for additional one hour. The change of the thickness of the sample plaques are recorded and heat deformation ration is calculated according to HD %=(D0−D1)/D0*100%, wherein D0 represents the original sample thickness and D1 represents the sample thickness after the deformation process. Calculated deformation ratios for the two parallel samples are averaged.

2.2. Tensile Test

ISO D1 plaque is prepared by injection molding. The small dumbbell bar is cut from the plaque by die cutter according to 811-1-4 IEC 1985. Tensile tests are conducted on an INSTRON 5565 tensile tester at the speed of 50 mm or 500 mm. Tensile tests are carried out according to ASTM D638 at room temperature.

2.3. Mimic VW-1

Mimic VW-1 FR test is conducted in the UL94 chamber. Test specimens are limited to the dimension of 200*2.7*1.9 mm. The specimen is hung on a clamp, with longitudinal axis vertical by applying 50 g loading on the bottom end. One paper flag (2*0.5 cm) is applied on the top of the wire. The distance of flame bottom (highest point of the burner oracle) to the bottom of flag is 18 cm. Flame is applied continuously for 45 seconds. After flame time (AFT), uncharred wire length (UCL) and uncharred flag area percentage (flag uncharred) is recorded during and after combustion. Four or 5 specimens are tested for each sample. Any of the following phenomenons are marked as "not pass":

1. Cotton under the specimen is ignited;
2. Flag is burned out;
3. Dripping with flame.

TABLE 2

Performance of Compounded Samples

| | CE-1 | CE-2 | CE-3 | CE-4 | CE-5 |
|---|---|---|---|---|---|
| SEBS G1643M | 25 | 25 | 25 | 25 | 5 |
| SEBS G1651ES | 15 | 15 | 15 | 15 | 15 |
| VERSIFY DE3300 | — | — | — | — | 20 |
| PP C715-12 | 20 | 20 | 20 | 20 | 20 |
| APP C30 | 23 | 28 | 25 | 23 | 23 |
| PER | 7.5 | 5 | 5 | 10 | 7.5 |
| Melamine | 7.5 | 5 | 8 | 5 | 7.5 |
| ZnO | 2 | 2 | 2 | 2 | 2 |
| Total | 100 | 100 | 100 | 100 | 100 |
| Mimic VW-1 | 0/2 | 0/2 | 0/2 | 1/3 | 0/2 |

TABLE 3

Performance of Compounding Samples (Inventive Examples)

| | IE-1 | IE-2 | IE-3 | IE-4 |
|---|---|---|---|---|
| PP(C715-12) | 20 | 20 | 12 | 12 |
| SEBS(G1643M) | 25 | 25 | | |
| SEBS(G1651) | 15 | 15 | | |
| VERSIFY 4200 | | | 48 | 48 |
| APP C30 | 19 | | | 19 |
| PER | 5 | 5 | 5 | 5 |
| JLS PNP1D | | 19 | 19 | |
| Melamine | 5 | 5 | 5 | 5 |
| Piperazine Phosphate | 10 | 10 | 10 | 10 |
| ZnO | 1 | 1 | 1 | 1 |
| Total | 100 | 100 | 100 | 100 |
| Mimic VW-1(Pass/Total) | 3/3 | 3/3 | 5/5 | 3/3 |

TABLE 4

Wire Performance of the Inventive Examples

| | IE5 |
|---|---|
| PP(C715-12) | 20 |
| SEBS(G1643M) | 25 |
| SEBS(G1651) | 15 |
| JLS PNP1D | 22 |
| Piperazine Phosphate | 10 |
| ZnO | 1 |
| Melamine | 5 |
| PER | 2 |
| Irganox 1010 | 0.8 |
| Irganox PS802 | 0.2 |
| Irgafos 168 | 0.1 |
| Irganox MD1024 | 0.2 |
| Total | 101.3 |
| Heat Deformation @150° C. (Plaque) | 36% |
| Wire performance | |
| TS, Mpa | 14.78 |
| TE, % | 520 |
| TS, Mpa (aged at 121° C. for 168 h), | 13.46 |
| TE, % (aged at 121° C. for 168 h) | 431 |
| TS retention, % | 91% |
| TE retention, % | 83% |

As shown in the Table 2, CE-1 to CE-5, conventional APP/PER/Melamine, which has very robust flame retardant performance in polypropylene matrix, does not achieve a good flame retardant performance in the PP/SEBS matrix at different ratios even with the presence of ZnO as a synergist.

As shown in the Table 3, IE-1, if 10 parts APP is replaced by piperazine phosphate, the flame retardant performance is improved dramatically to pass the mimic VW-1 test. The flame retardant performance is still robust if the PNP1D is combined with piperazine phosphate (IE-2). Both of the flame retardant packages in IE-1 and IE-2 have similar performance in PP/VERSIFY matrix. (IE-3 and IE-4).

As shown in Table 4, IE 5 passes the VW-1 test robustly and meets the other requirements such as mechanical properties, aging performance at 121° C., and heat deformation at 150° C.

TABLE 5

Performance of Compounded Samples

| | CE-6 | CE-7 | CE-8 | IE-6 | IE-7 | IE-8 | IE-9 | IE-10 | IE-11 | IE-12 |
|---|---|---|---|---|---|---|---|---|---|---|
| PP(C715-12) | 20 | 20 | 20 | 20 | 20 | 20 | 20 | 20 | 20 | 17.5 |
| SEBS(G1643M) | 25 | 25 | 25 | 25 | 25 | 25 | 25 | 25 | 25 | 10 |
| SEBS(G1651) | 15 | 15 | 15 | 15 | 15 | 15 | 15 | 15 | 10 | 15 |
| VERSIFY 3300 | | | | | | | | | | 17.5 |

TABLE 5-continued

Performance of Compounded Samples

| | CE-6 | CE-7 | CE-8 | IE-6 | IE-7 | IE-8 | IE-9 | IE-10 | IE-11 | IE-12 |
|---|---|---|---|---|---|---|---|---|---|---|
| APP C30 | | | | | | 10 | | | | 9 |
| PER | | | | 5 | 5 | 5 | 2 | 2 | 2 | 5 |
| IFS PNP1D | 40 | 40 | 40 | 24 | 24 | 19 | 27 | 34 | 39 | 20 |
| Melamine | | | | | 5 | 5 | | 3 | 3 | 5 |
| MPP Budit 3141 | | | | 10 | 5 | | 10 | | | |
| T-SAN | | | 1 | | | | | | | |
| ZnO | | 1 | | 1 | 1 | 1 | 1 | 1 | 1 | 1 |
| Total | 100.00 | 101.00 | 101.00 | 100.00 | 100.00 | 100 | 100 | 100 | 100 | 100 |
| Heat deformation @ 150° C., % | 16 | 18 | 19 | 22 | 21 | 25 | 20 | 23 | 25 | 24 |
| Mimic VW-1(Pass/Total) | 4/4 | 3/3 | 0/2 | 4/4 | 4/4 | 4/4 | 4/4 | 4/4 | 3/3 | 3/3 |
| Sag | Yes | Yes | No | No | No | No | No | No | No | No |
| Dripping | Yes | Yes | No | No | No | No | No | No | No | No |

As shown in the Table 5, CE-6 and 7, PNP1D flame retardant alone doe not achieve a robust flame retardant performance to pass the mimic VW-1 test even with the presence of ZnO as a synergist. The charring is not as fast. The sag and dripping are severe. These result in the large variable in the correlation between mimic VW-1 and VW-1. As shown in Table 6, CE-9 with the same formulation as CE-6 failed in the VW-1 test.

The anti-dripping agent, T-SAN, used in CE-8 improves the sag and dripping problem, but it sacrifices flame retardant performance, possibly because the anti-dripping agent limits the intumescence of the charring. The flags finally burned due to less intumescent char. However, if the flame retardant packages in IE-6 to IE-12 are used, flame retardant performance becomes sufficiently robust to pass the mimic VW-1 test. Furthermore, as shown in the Table 6, IE-13 and IE-14, these flame retardant packages also have robust VW-1 performance in the final coated wire. Furthermore, the IE-13 and IE-14 pass the other requirements such as heat deformation at 150° C., mechanical properties and aging performance at 121° C.

TABLE 6

Wire Performance

| | CE-9 | IE-13 | IE-14 |
|---|---|---|---|
| PP(C715-12) | 20 | 20 | 20 |
| SEBS(G1643M) | 25 | 25 | 25 |
| SEBS(G1651) | 15 | 10 | 15 |
| JLS PNP1D | 40 | 39 | 27 |
| Melamine | | 3 | |
| Budit 3141 | | | 10 |
| ZnO | | 1 | 1 |
| PER | | 2 | 2 |
| Irganox 1010 | 0.8 | 0.8 | 0.8 |
| Irganox PS802 | 0.2 | 0.2 | 0.2 |
| Irgafos 168 | 0.1 | 0.1 | 0.1 |
| Irganox MD1024 | 0.2 | 0.2 | 0.2 |
| Total | 101.3 | 101.3 | 101.3 |
| Heat Deformation @150° C. Plaque | 15 | 25 | 20 |
| Wire performance | | | |
| VW-1 | 1/2 | 3/3 | 3/3 |
| TS, Mpa | 10.6 | 10.9 | 12.3 |
| TE, % | 335 | 453.3 | 482.7 |
| TS, MPa (aged at 121° C. for 168 h) | 9.5 | 9.6 | 11.3 |
| TE, % (aged at 121° C. for 168 h) | 272 | 377.3 | 378.7 |
| TS retention, % | 90 | 88 | 92 |
| TE retention, % | 81 | 83 | 78 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A composition comprising:
 (A) a polymer blend comprising:
  (1) from 5 to 80 weight percent polypropylene, based on the weight of the composition, and
  (2) from 5 to 80 weight percent thermoplastic elastomer (TPE) other than the polypropylene of (A)(1), and
 (B) an intumescent flame retardant comprising:
  (i) an intumescent hybrid polyphosphate of formula (1)

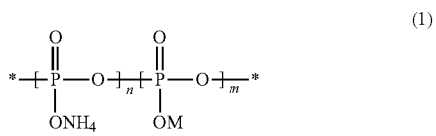

(1)

where M is at least one of morpholine, piperazine, piperidine, alkyl hydroxyl or a triazine polymer of formula (2)

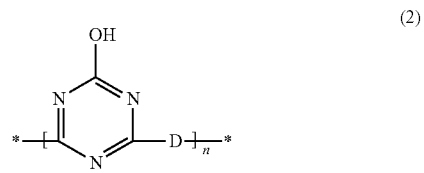

(2)

where D is a heterocyclic or polyamine moiety, and m and n are independently integers, the sum (m+n) of which is less than (<) 1000, and
  (ii) a piperazine phosphate.

2. The composition of claim 1 comprising from 5 to 60 weight percent polypropylene and from 10 to 80 weight percent TPE.

3. The composition of claim 1 comprising from 1 to 70 weight percent of the intumescent flame retardant.

4. The composition of claim 1 in which the polypropylene of (A)(1) is impact-modified polypropylene, and the TPE is at least one of a styrenic block copolymer, an ethylene-based elastomer or plastomer, an ethylene block copolymer and a propylene-based plastomer or elastomer.

5. The composition of claim 1 in which the intumescent flame retardant further comprises one or more of halogen-free organic phosphonic acids, phosphonates, phosphinates, phosphonites, phosphinites, phosphine oxides, phosphines, phosphites, phosphates, phosphonitrilics, phosphorus ester amides, phosphoric acid amides, phosphonic acid amides, phosphinic acid amides, melamine and melamine derivatives, pentaerythritol, triglyceride isocyanurate, novolac and a metal oxide or salt.

6. The composition of claim 5 in which the metal oxide is zinc oxide.

7. A wire or cable sheath made from the composition of claim 1.

8. A wire or cable comprising the sheath of claim 7.

9. The composition of claim 1 comprising from 5 to 60 weight percent polypropylene and from 10 to 80 weight percent TPE.

10. The composition of claim 1 in which the polypropylene of (A)(1) is impact-modified polypropylene, and the TPE is at least one of a styrenic block copolymer, an ethylene-based elastomer or plastomer, an ethylene block copolymer and a propylene-based plastomer or elastomer.

11. The composition of claim 1 in which the intumescent flame retardant further comprises one or more of halogen-free organic phosphonic acids, phosphonates, phosphinates, phosphonites, phosphinites, phosphine oxides, phosphines, phosphites, phosphates, phosphonitrilics, phosphorus ester amides, phosphoric acid amides, phosphonic acid amides, phosphinic acid amides, melamine and melamine derivatives, pentaerythritol, triglyceride isocyanurate, novolac and a metal oxide or salt.

12. The composition of claim 11 in which the metal oxide is zinc oxide.

13. A wire or cable sheath made from the composition of claim 1.

14. A wire or cable comprising the sheath of claim 13.

* * * * *